United States Patent Office 2,709,670
Patented May 31, 1955

2,709,670

DIAGNOSTIC METHOD USING TREPONEMA PALLIDUM

Rose R. Ichelson, Philadelphia, Pa., assignor of one-fourth to Edward Unterberger and one-fourth to Joseph G. Denny, Jr.

No Drawing. Application June 26, 1950, Serial No. 170,469

2 Claims. (Cl. 167—84.5)

This invention is a diagnostic method utilizing a product having as its active principle a sub-culture in vitro of *Treponema pallidum* of the human strain nurtured on a hog blood constituent increasing its viability and fecundity without altering its morphology or impairing its pathogenicity.

This application is a continuation in part of my application Serial No. 479,608 on which my Patent No. 2,513,327 issued on July 4, 1950.

The product utilized in my method preferably comprises a sterile dispersion of a pure sub-culture in vitro of *Treponema pallidum* of a human strain initially cultured from human syphilomata in a medium comprising a major portion of human blood serum and a minor portion of hog blood and sub-cultured in a medium free from tissue and having hog blood serum as its major constituent. Generally the sub-cultures are killed by heat but for certain purposes the sub-cultures are permitted to live and die naturally in a nutrient medium and form therewith a toxic solution.

It has been hitherto impossible to produce pure derivatives from *Treponema pallidum* grown in the human body because only a very few are ever observable in human syphilomata and it has been impossible to produce pure derivatives from cultures in vitro of *Treponema Pallidum* of the human strain because as pointed out in Bulletin No. 6 (Syphilis) of the American Association for the Advancement of Science (The Science Press 1938) "*Spirochete pallida (Treponema pallidum)* is a fragile parasite susceptible to many destructive agents in the environment, such as dryness, light, heat and cold; and it cannot live long away from the human body. Having neither intermediate host nor known encystment stage, it must make a quick leap from host to host or perish" (p. 36). "There is an extensive literature on the culturing of *Sp. pallida,* the best known procedure being that of Noguchi 1911. Published reports are conflicting, however, and for the present may be regarded with distrust. Until growth of the spirochete of syphilis in test tubes is a well established fact, it is improbable that the life cycle of the organism can be completely and satisfactorily demonstrated. Our experiences with rabbit inoculations to aid in determining the life cycle of *Spirochete pallida* have been far from satisfactory. If anything, they have confused the issue. There has been some difficulty in positively distinguishing the lesions of rabbit spirochetosis (*Sp. cuniculi*) from those of human syphilis in rabbits (*Sp. pallida*). Dr. Warthin did not consider the lesions produced in rabbits by strains of *Sp. pallida* to be characteristic nor comparable to those of human syphilis" (p. 51). "Syphilis of the rabbit is not entirely comparable to either acquired or congenital syphilis of man, but combines elements of both conditions" (p. 64).

I have attained real success in cultivation of *Treponema pallidum* sub-cultures over a period of years, with consistent success in the initial isolation of fresh strains of *Treponema pallidum* from humans, anaerobically in liquid media, and with the development of cultures from such initial strains which can be sub-cultured in the first and subsequent transfers in a more plentiful culture medium free from solids and contaminating substances and without loss of pathogenicity or virulence for many generations and have made therefrom useful derivatives as herein set forth.

I have discovered that pure, pathogenic fresh strains or cultures of *Treponema pallidum* from human syphilomata may be initially propagated prolifically in vitro in a liquid culture medium comprising a major portion of human blood serum and a minor portion of hog blood; that pure, pathogenic sub-cultures of *Treponema pallidum* may be further propagated prolifically in vitro from an initial culture either in a like culture medium or in a culture medium comprising pure hog blood serum: and that the addition of small amounts of calcium chloride and glucose to both such media greatly increases the fecundity, motility and apparent vigor of the microorganisms without apparent change in the morphology or pathogenicity thereof.

In preparing the primary culture medium, I preferably add a nutrient, say 0.1 gram of glucose, and 0.02 gram of calcium chloride (C. P.), to 100 c. c. of freshly obtained, human, serologically negative blood serum collected under sterile conditions. This mixture may be placed in small quanta, say 5 c. c., in ordinary cotton-stoppered, sterile culture tubes and the mixture in the stoppered tubes may be incubated in a water bath, at, say, 54° to 60° C. for 24 hours to inhibit anti-bodies, insure freedom from micro-organisms or spores and destroy the activity of complement.

100 c. c. of sterile hog blood is collected in, say, 10 c. c. of physiological salt solution (a 0.85 aqueous solution of sodium chloride) containing say, 1% sodium citrate or other mild anticoagulant.

About one drop ($\frac{1}{16}$ c. c.) of the stabilized hog blood is mixed with 5 c. c. of the serologically negative, sterile, human blood serum in one of the culture tubes, and to this is added one drop of human chancre fluid or other syphilomata containing *Treponema pallidum,* and preferably free from blood or tissue. The culture media containing the inoculum is covered with a layer of equal parts of paraffin and yellow vaseline; the tube is stoppered with sterile cotton plugs, covered with paraffin, and placed in an incubator at an incubating temperature, say 30° C. After from five to fourteen days under anaerobic incubating conditions, the multiplication of the *Treponema pallidum* becomes visually apparent, and after three to four weeks the growth becomes very heavy. The blood corpuscles or debris therefrom gradually settle toward the bottom and the *Treponema pallidum* congregate in greatest numbers toward the top of the medium in the test tube during incubation, so that cultures may be withdrawn from the tube substantially free from any corpuscles or debris therefrom.

From this initial culture, sub-cultures may be developed in the same manner in further tubes containing a like culture medium, but for the production of useful derivatives the sub-cultures are preferably developed in a culture medium of hog blood serum free from tissue or corpuscles.

In making the hog blood serum, fresh hog blood is initially cooled, coagulated and centrifuged to separate the serum from the solids. The serum is kept cool and under sterile conditions until needed. When the serum is to be used as a culture medium, a small amount, say 0.02%, of calcium chloride, and a small amount of nutrient substance, say 0.1% of glucose, is added to the serum and the mixture heated in a culture tube to say 54° to 60° C. for a half hour or more. After cooling to say 35° C., a drop of the *Treponema pallida* culture previously developed in the compound of human blood serum and hog blood is added and the culture tube sealed as above described. The sub-cultures are incubated anaerobically at substantially the same temperature, for substantially the same time, and under substantially the same conditions, as the primary culture.

The sub-cultures, originating in vitro, appear to flourish and multiply in the culture medium having hog blood serum as its major constituent as well as the fresh strains, originating in vivo, flourish and multiply in the culture medium having human blood serum as its major constituent.

Sub-sub-cultures ad infinitum may be propagated in the same manner and in either culture medium without any morphological change, or loss of motility, or loss of virulence in the micro-organisms. When examined with the dark field microscope at any stage of culture or sub-culture, the micro-organisms exhibit the characteristic morphological features, movements and details of structure of pathogenic *Treponema pallidum*.

When *Treponema pallidum* cultures are mixed with hog serum or blood, diluted or undiluted, the organisms became more active and do not clump or agglutinate, whereas upon the mixture of the same culture with equal amounts of diluted or undiluted sera of rabbits, guinea pigs, cattle, horses, or sheep, the organisms began to clump.

While the Wasserman reaction from rabbits, guinea pigs and calves' blood could be positive, the Wasserman reactions from hog blood were always negative, and, since hogs cannot be infected with syphilis, it would appear that no anti-bodies are present in their blood which interfere with the multiplication of *Treponema pallidum*, and that the unique position in mammalian physiology occupied by the metabolism of the hog, as well as the resistance of its blood serum to contaminating organisms and to hemolysis and its long retention of its natural biological properties, renders it peculiarly suitable for use in *Treponema pallidum* culture mediums.

Whatever the explanation, my researches and invention have resulted in real success in the prolific cultivation in vitro of virulent, pathogenic *Treponema pallidum*, free from contamination, with ease and certainty, and from strains originating in human syphilomata and indistinguishable (except by their increased viability, motility and fecundity) from the micro-organisms of the original syphilomata, and hence can only be defined by their source and method of production.

In the production of derivatives from the *Treponema pallidum* cultures hereinbefore described, I may use the cultures grown in either the primary culture medium or in the secondary culture medium, but preferably use the latter because of the absence of blood corpuscles or debris therefrom present in the concentration of *Treponema pallidum*.

When a sufficient growth of the *Treponema pallida* has accumulated, the portion of the culture medium containing them may be decanted into a high speed centrifuge and centrifuged at high speed for an hour to separate the fluid from the solids. The solids are washed several times with physiological saline solution until all traces of the original culture medium are gone.

The cultures originating in human strains of *Treponema pallidum* and cultured in human blood serum and hog blood or in hog blood serum are rendered suitable for agglutination tests for syphilis by washing away all traces of the culture media and mixing the micro-organisms in a physiological saline solution and heating at 65° C. for one hour. The resultant product or antigen has a nephelometer density of approximately one hundred million organisms per c. c.

In accordance with my present invention, the addition and commingling of a drop of undiluted human syphilitic sera to a drop of such product on a slide produces complete agglutination or clumping of its micro-organisms within four and a half to ten minutes, whereas negative sera, diluted or undiluted, produces no agglutination. Such clumping is clearly visible through a dark field microscope and has proved accurate in differentiating between serums from syphilitic and non-syphilitic humans even in cases where Wasserman complement fixation tests gave false indications due to known non-syphilitic changes in the blood resulting from cancer and other causes.

The degree of syphilitic infection of human sera may be determined, in accordance with my present invention, by placing in a series of transparent tubes various dilutions of suspected human blood serum. One tube may contain a physiological saline solution free from serum and the serum in the other tubes may be diluted with such saline solution in the respective proportions of, say for example, 1 to 20; 1 to 40; 1 to 80; 1 to 160; 1 to 320; 1 to 640; and 1 to 1280. An equal amount of my antigen is introduced into each tube. If the fluids in the tubes remain clear, the suspected serum is free from syphilitic infection. If, however, the suspected serum is actually infected, agglutination or clumping will result causing cloudiness in the fluid in the various tubes proportional to the concentration of the positive serum in the saline solution, and indicating the degree of infection.

My antigen is suitable for agglutination tests because it is completely tissue free and there is consequently no colloidal dispersion of tissue to introduce a false cloudiness when introduced into blood serum.

It is physically impossible to segregate dispersed *Treponema pallidum* from colloidally dispersed tissue, hence cultures in vivo cannot be used for such agglutination tests.

Having described my invention, I claim:

1. In a diagnostic method, the step which comprises commingling human blood serum suspected of syphilitic infection with a tissue-free liquid dispersion of a sub-culture in vitro of *Treponema pallidum* of the human strain.

2. In a diagnostic method, the steps which comprise commingling equal amounts of tissue-free liquid dispersion of a sub-culture in vitro of *Treponema pallidum* of the human strain with a series of different dilutions of human sera suspected of infection with syphilis

References Cited in the file of this patent

UNITED STATES PATENTS

| | | |
|---|---|---|
| 2,255,079 | Morrison | Sept. 9, 1941 |
| 2,513,327 | Ichelson | July 4, 1950 |

FOREIGN PATENTS

| | | |
|---|---|---|
| 626,628 | Germany | Feb. 29, 1941 |

OTHER REFERENCES

Noguchi in J. Exp. Med., vol. 14, 1911, pp. 557–568.

Zinsser, "Textbook of Bacteriology," 7th ed., 1935, pp. 792–796, 1131, 1132.

Gershenfeld, "Bacteriology and Allied Subjects," 1945, pp. 477, 478, 496.